(12) United States Patent
Noel et al.

(10) Patent No.: US 7,444,636 B2
(45) Date of Patent: Oct. 28, 2008

(54) METHOD AND SYSTEM OF DETERMINING ATTRIBUTES OF A FUNCTIONAL UNIT IN A MULTIPLE PROCESSOR COMPUTER SYSTEM

(75) Inventors: Karen L. Noel, Pembroke, NH (US); Wendell B. Fisher, Jr., Nashua, NH (US); Gregory H. Jordan, Hollis, NH (US); Christian Moser, Helsinki (FI)

(73) Assignee: Hewlett-Packard Development Company, L.P., Houston, TX (US)

( * ) Notice: Subject to any disclaimer, the term of this patent is extended or adjusted under 35 U.S.C. 154(b) by 836 days.

(21) Appl. No.: 10/619,853

(22) Filed: Jul. 15, 2003

(65) Prior Publication Data

US 2004/0073907 A1  Apr. 15, 2004

(51) Int. Cl.
 *G06F 9/46* (2006.01)
 *G06F 9/34* (2006.01)
 *G06F 15/173* (2006.01)

(52) U.S. Cl. .................. 718/104; 711/203; 709/223
(58) Field of Classification Search ................. 719/319; 718/104; 711/203; 709/223
See application file for complete search history.

(56) References Cited

U.S. PATENT DOCUMENTS

| | | | |
|---|---|---|---|
| 5,269,013 A * | 12/1993 | Abramson et al. | 711/170 |
| 5,594,903 A * | 1/1997 | Bunnell et al. | 717/162 |
| 5,897,664 A * | 4/1999 | Nesheim et al. | 711/206 |
| 6,092,157 A * | 7/2000 | Suzuki | 711/147 |
| 6,105,053 A * | 8/2000 | Kimmel et al. | 718/105 |
| 6,148,387 A * | 11/2000 | Galasso et al. | 711/203 |
| 6,233,668 B1 * | 5/2001 | Harvey et al. | 711/206 |
| 6,266,745 B1 * | 7/2001 | de Backer et al. | 711/147 |
| 6,314,501 B1 * | 11/2001 | Gulick et al. | 711/153 |
| 6,347,362 B1 * | 2/2002 | Schoinas et al. | 711/147 |
| 6,499,028 B1 * | 12/2002 | Brock et al. | 707/4 |
| 2002/0052914 A1 * | 5/2002 | Zalewski et al. | 709/203 |
| 2002/0087652 A1 | 7/2002 | Davis et al. | |
| 2003/0088608 A1 * | 5/2003 | McDonald | 709/106 |
| 2003/0131067 A1 * | 7/2003 | Downer et al. | 709/213 |
| 2005/0050191 A1 * | 3/2005 | Hubis | 709/223 |

OTHER PUBLICATIONS

Jim Boyce. Windows 2000 Quick Fixes. O'Reilly Press, Dec. 2000. Chapter 2.1.1: Use the Device Manager to manage device resources.*
Dunn, Joe; Shucker, Brian; and Browne, Rich. "The Design and Implementation of JaDiSM". University of Colorado at Boulder, Dec. 2001.*
D. Mosberger et al.; "ia-64 linux kernel, design and implementation"; Copyright 2002 by Hewlett-Packard Company (6 p.).

* cited by examiner

*Primary Examiner*—Meng-Ai An
*Assistant Examiner*—Camquy Truong

(57) ABSTRACT

A method and system of determining by a first program an attribute of a first functional unit by referencing a virtual memory address (the first functional unit comprising a first processor and a random access memory (RAM) coupled to the first processor in a computer system, and the first program executing in the first functional unit), determining by a second program an attribute of a second functional unit by referencing the virtual memory address (the second functional unit comprising a second processor and a RAM coupled to the second processor in the computer system, and the second program executing in the second functional unit), wherein referencing the virtual memory address by the first program provides a pointer to an attribute stored in the RAM of the first functional units, and wherein referencing the virtual memory address by the second program provides a pointer to an attribute stored in the RAM of the second functional unit.

9 Claims, 3 Drawing Sheets

METHOD AND SYSTEM OF DETERMINING ATTRIBUTES OF A FUNCTIONAL UNIT IN A MULTIPLE PROCESSOR COMPUTER SYSTEM

BACKGROUND

High performance computer systems may utilize multiple processors to increase processing power. The workload may be divided and distributed among the processors thereby reducing execution time and increasing performance. An architectural model for high performance multiprocessor system may be a Non-Uniform Memory Access (NUMA) system.

Under the NUMA model, system resources, such as processors and random access memory, may be segmented into groups or units referred to as Resource Affinity Domains (RADs). Thus, each RAD may comprise one or more processors and associated physical memory. A processor in a RAD may access the memory assigned to its RAD, referred to as local memory referencing, or a processor may access memory assigned to other RADs. Non-local memory references may carry a performance penalty. Thus, computer system performance may be increased if non-local memory references can be reduced.

SUMMARY

The problems noted above may be solved in large part by a method and system of determining attributes of a functional unit in a multiple processor system. In one exemplary embodiment, a method comprises: determining by a first program an attribute of a first functional unit by referencing a virtual memory address (the first functional unit comprising a first processor and a random access memory (RAM) coupled to the first processor in a computer system, and the first program executing in the first functional unit), determining by a second program an attribute of a second functional unit by referencing the virtual memory address (the second functional unit comprising a second processor and a RAM coupled to the second processor in the computer system, and the second program executing in the second functional unit), wherein referencing the virtual memory address by the first program provides a pointer to an attribute stored in the RAM of the first functional unit, and wherein referencing the virtual memory address by the second program provides a pointer to an attribute stored in the RAM of the second functional unit.

BRIEF DESCRIPTION OF THE SYSTEM AND DRAWINGS

A better understanding of the disclosed systems and methods may be obtained by reference to the following drawings, in which.

Figure 1:
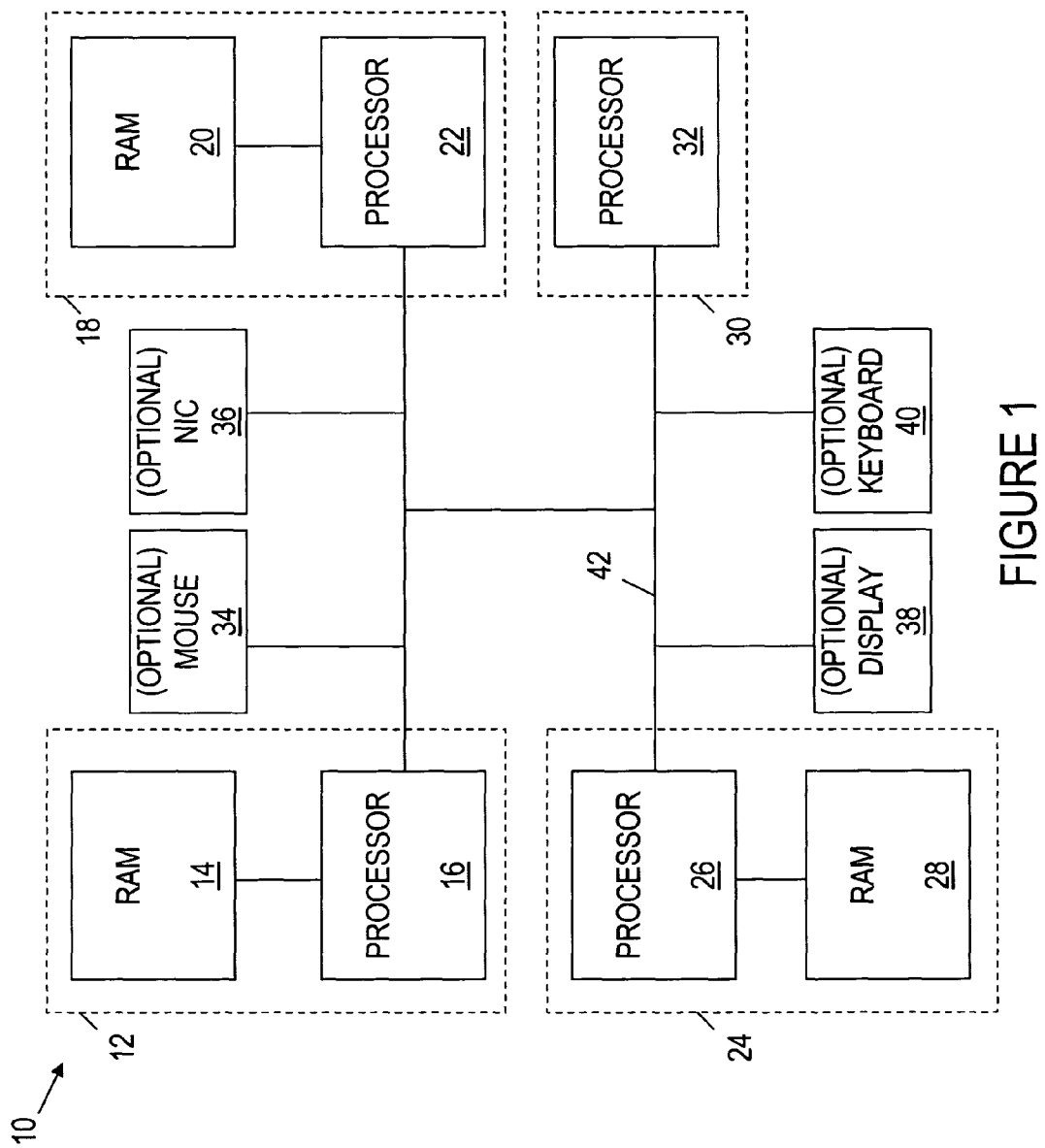
FIG. 1 illustrates a computer system in accordance with embodiments of the invention.

While the invention is susceptible to various modifications and alternative forms, embodiments of the invention are shown by way of example in the drawings and described herein. It should be understood, however, that the drawings and detailed description are not intended to limit the invention to the particular form disclosed, but on the contrary, the invention is to cover all modifications, equivalents and alternatives falling within the spirit and scope of the present invention as defined by the appended claims.

NOTATION AND NOMENCLATURE

Certain terms are used throughout the following description and claims to refer to particular components and systems. Computer and software companies may refer to components by different names. This document does not intend to distinguish between components and systems that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

FIG. 1 illustrates an exemplary computer system 10. Embodiments of the invention may be directed to computer system with multiple processors, and thus FIG. 1 illustrates four processors 16, 22, 26 and 32; however, any number of processors may be used. The processors 16, 22, 26 and 32 may couple to each other, and possibly other computer system 10 components, by way of an address/data bus 42. The processors 16, 22, 26 and 32 may comprise any suitable processor, or array of processors, e.g., processors available from Hewlett-Packard, Intel and AMD. Computer system 10 may also comprise random access memory (RAM) 14 coupled to processor 16, RAM 20 coupled to processor 22, as well as RAM 28 coupled to processor 26. RAM 14, 20 and 28 may provide a working area from which the processors 16, 22, 28 and 32 read and execute commands, and temporarily read and store data.

Still referring to FIG. 1, computer system 10 may optionally couple to a display device 38 upon which data or other information generated by the computer system 10 may be displayed. The display device 38 may comprise any suitable display or monitor, such as a cathode ray tube (CRT) based display or a liquid crystal display (LCD). Further, computer system 10 may optionally couple to a keyboard 40 and/or mouse 34. Optional keyboard 40 may be used for inputting commands and data, and may comprise any available full or partial data entry device or keypad. Likewise, optional mouse 34 may be used for cursor control functions. In at least some embodiments, the computer system 10 may be operated as a server, which may mean that the device is placed in a data center and dedicated to specific tasks. In server operation, a plurality of servers may be placed within a rack or enclosure, and in such a circumstance the optional display, keyboard and mouse may not be used. The computer system 10 may also optionally comprise a network interface card (NIC) 36, or possibly several NICs, coupled by way of the address/data bus 42. The NIC 36 may allow the computer system 10 to couple to other network devices, such as other computers, switches and routers. The computer system 10 may also comprise storage devices, such as one or more hard disk drives, one or more removable disks, and one or more compact disc systems, although these devices are not specifically shown.

One or more processors and associated RAM (if any) may form a functional unit. Thus, processor 16 and RAM 14 may form a functional unit 12. Processor 22 and RAM 20 may form a functional unit 18. Processor 26 and RAM 28 may form a functional unit 24. Though processor 32 may not have attached or associated RAM, the processor 32 may likewise be a functional unit 30. Though FIG. 1 illustrates only one processor in each functional unit, there may be multiple processors in each functional unit.

At least some embodiments of the invention may be multiple processor computer systems operated under an architecture known as the non-uniform memory access (NUMA) model. Under the NUMA model, system resources such as processors and RAM may be segmented into functional units, which the NUMA model may call resource affinity domain (RADs).

Figure 2:
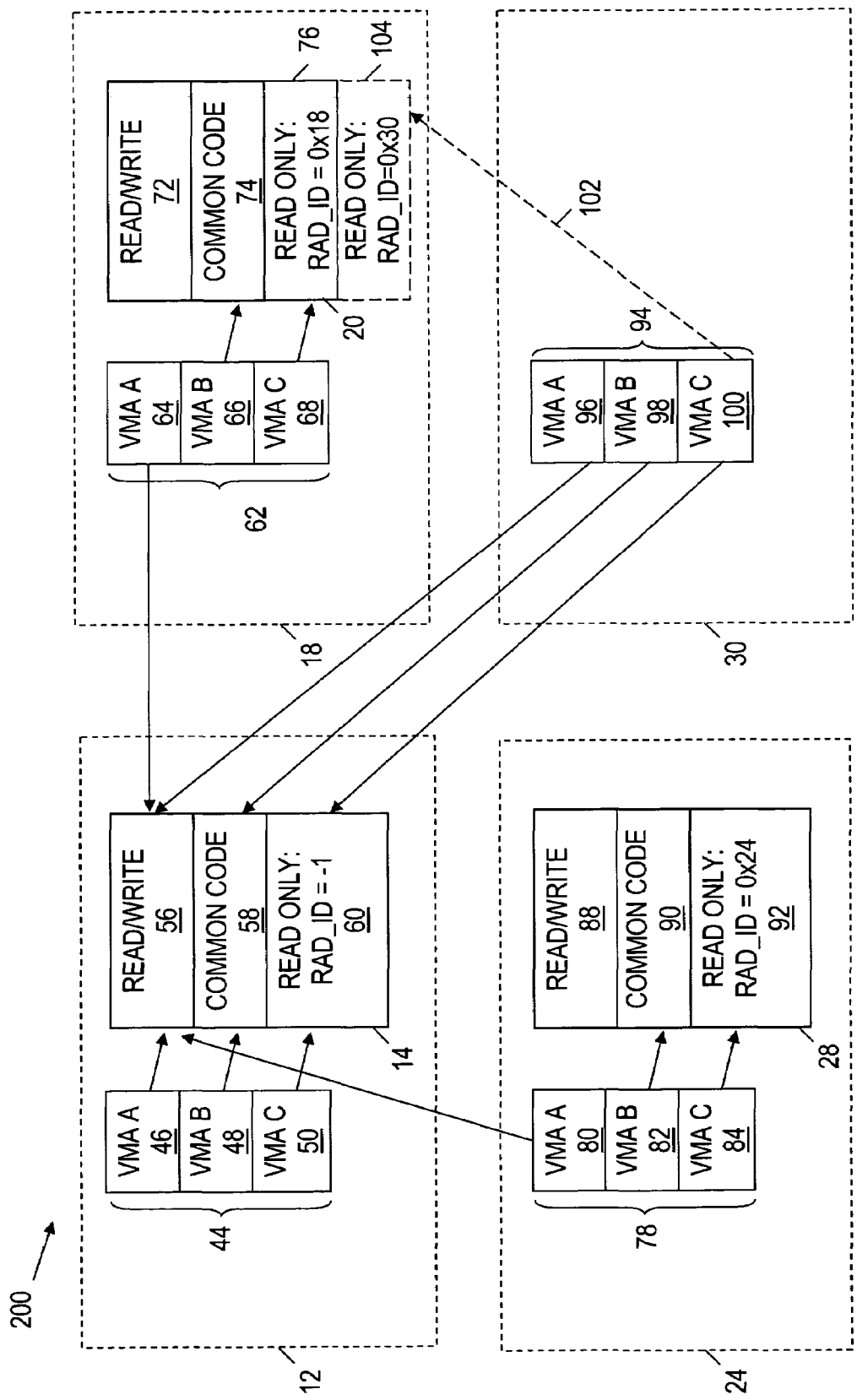
FIG. 2 illustrates a Non-Uniform Memory Access (NUMA) system in accordance with embodiments of the invention.

FIG. 2 illustrates aspects of the exemplary system of FIG. 1 operated under the NUMA model. The exemplary system 200 of FIG. 2 may comprise four functional units or RADs numbered 12, 18, 24 and 30; however, any number of RADs may be used. Each of the RADs 12, 18, 24 and 30 may have associated therewith a page table 44, 62, 78 and 94 respectively. A page table may be a table, possibly stored in RAM or cache memory of a processor, that may provide virtual memory address (VMA) to physical memory address (PMA) translation. The VMA may be a virtual address used by user and/or operating system programs to access physical memory. In accordance with embodiments of the invention, each VMA A may have the same virtual address; each VMA B may have the same virtual address; and each VMA C may have the same virtual address. Depending on the configuration, VMAs having the same virtual address, however, may not necessarily point to the same physical address.

Consider for purposes of explanation the page table 44 and RAM 14 within RAD 12. Each VMA 46, 48 and 50 within the page table 44 may map to physical addresses within RAM. In accordance with embodiments of the invention, VMA B 48 and VMA C 50 may map to RAM 14 within RAD 12. VMA A 46, directed to read/write portions of memory, may map to any read/write area 56, 72 or 88 in any RAM 14, 20 or 28 in the system 200. The illustration of FIG. 2 shows VMA A 46 pointing only to read/write area 56 so as not to unduly complicate the figure. Thus, exemplary page table 44 may provide address translations to the physical memory within RAM 14 for VMA B 48 and VMA C 50. Exemplary page table 62 may provide address translations to RAM 20 in RAD 18 for VMA B 66 and VMA C 68. Likewise, exemplary page table 78 may provide address translations to RAM 28 in RAD 24 for VMA B 82 and VMA C 84. In accordance with at least some embodiments of the invention, each VMA providing address translation to portions of RAM designated as read/write may provide address translation to the same physical memory. Thus, VMA A 64 (in RAD 18), VMA A 80 (in RAD 24) and VMA A 96 (in RAD 30) point to the same physical address as VMA A 46 (in RAD 12): namely, read/write area 56. While each VMA A is illustrated as pointing to physical memory in RAD 12, VMAs for read/write memory may point to any RAM memory designated as read/write, such as read/write areas 72 and 88.

Page table 94 within RAD 30, possibly stored in cache memory of processor 32, may provide address translations to RAM in other RADs since the exemplary RAD 30 may not have associated RAM. As exemplified in FIG. 2, the page table 94 of RAD 30 may provide address translation to RAM 14 of RAD 12 for VMA B 98 and VMA C 100. VMA A 96 may point to read/write area 56, or whichever physical memory location to which each VMA A may point. A particular RAD not having associated RAM may be the result of RAD devices rarely accessing memory; the lack of RAM may be a limitation created by the system designer, or the RAM associated with a processor in a RAD may experience a hardware failure. Alternatively, a RAD may have RAM but still may be involved in dependence for reasons such as a system administrator turning off read-only memory replication, or replication may have yet to be set up, such as early stages of the boot process. Thus, processors may access memory within their RAD (local memory), or memory in other RADs (non-local memory). References to non-local memory, however, may incur increased memory access times, as compared to reference to local memory. Because of the non-local mapping of the exemplary RAD 30, in the exemplary system RADs 12 and 30 may be referred to as being involved in dependence.

In accordance with embodiments of the invention, memory within a RAD may take three designations: read/write, common code, and read-only. That is, while the memory within each RAD may be RAM, e.g., RAM 14, 20, and/or 28, portions of that RAM may take various designations to fulfill purposes within the RAD. Memory within each designation may be broken down into subgroups, which may be referred to as pages. Read/write area or pages 56, 72 and 88 may contain programs and data utilized by processes needing to store and retrieve data. In system 200 and as discussed above, each VMA A 46, 64 and 80 may thus comprise a pointer to the same physical address in any of read/write pages 56, 72 and 88.

The second designation of RAM within a RAD may be common code. Common code pages may contain replicated portions of the operating system. That is, a computer system operated in accordance with embodiments of the invention may have or couple to a hard disk storage system (not shown) that stores operating system programs and instructions. In order to make the operating system programs and instructions easily accessible within each RAD, some of the operating system may be replicated into the common code pages 58, 74 and 90 within each RAD. A replication is a copying of a physical page so that two or more processors have a local copy of the page. For processors in RADs that have RAM within the RAD, the operating system may execute from the common code portion of the RAM. In the exemplary system 200, each VMA B 48, 66 and 82 may thus comprise a pointer to physical address for common code pages 58, 74 and 90 respectively.

Figure 3:
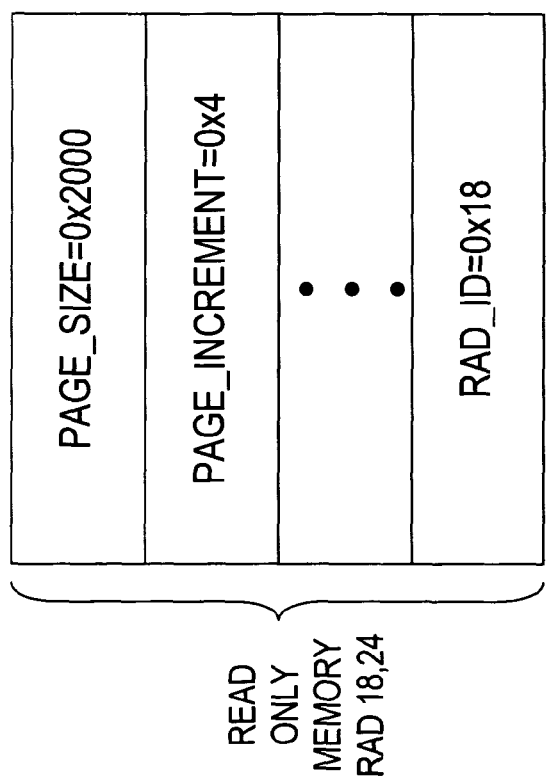
FIG. 3 illustrates a layout of RAM designated as read only associated with RADs in accordance with embodiments of the invention.

The third designation of RAM within a RAD may be read-only, which should not be confused with read-only memory (ROM) devices. Read-only pages 60, 76 and 92 may contain RAD specific attributes and static data that may be utilized by programs, such as replicated portions of the operating system in the common code pages. Referring to FIG. 3, the static data in the read only pages 60, 76, 92 may comprise common characteristics, e.g., page size and page increment. Each VMA C 50, 68, 84 (FIG. 2) may thus comprise a pointer to physical address for read-only pages of the RAM of RADs 12, 18 and 24 respectively.

RADs not involved in dependence, such as RADs 18 and 24, may also have RAD specific attributes stored in their read only pages 76, 92. There may be many RAD specific attributes that may be stored in the read only pages, such as pointers to RAD specific data structures, notations as to the low and high physical address of the shared memory space that resides within the RAD, lists of input/output (I/O) devices local to the RAD, and a RAD identifier. The exemplary RAD identifier will be used for purposes of discussing placement and use of RAD specific attributes; however, explanation of RAD specific attributes using the exemplary RAD identifier should not be construed as limiting the disclosure to just these embodiments.

RAD identifiers may be values that uniquely identify RADs. Accordingly, the RAM designated as read-only assigned to RADs 18 and 24 may have exemplary entries RAD_ID=0×18 and RAD_ID=0×24, respectively, as RAD specific attributes. The number selection is merely exemplary, and any number selection may be used in practice. RAD specific attributes such as RAD identifiers may be placed into the read-only pages by a system initialization process. The initialization process may be part of an operating system designed in accordance with the embodiments of the invention. In alternative embodiments of the invention, RAD specific attributes may be placed dynamically into read-only pages of the RAM when a trigger event occurs. This trigger event may be any suitable event, such as a memory access, a CPU scheduling request, and a boot sequence.

In accordance with embodiments of the invention, a program (possibly the portion of the operating system replicated into the common code pages) may determine a RAD specific attribute by reading the RAD specific attribute from the read only pages. The RAD specific attribute may be, for example, within which RAD the program is operating. Programs may find RAD specific attributes, such as the RAD identifier, useful in several respects. A first exemplary situation in which knowing the exemplary RAD identifier may be useful is in allocation of memory to a program. Referring again to FIG. 1, consider an exemplary program executing on processor 26 of RAD 24. If the program executing on processor 26 makes a request to an operating system program for allocation of memory, the allocation may come from two locations—local memory or non-local memory. In accordance with embodiments of the invention, an operating system or other memory allocating program may determine a RAD specific attribute, such as a RAD identifier, by reading the attribute from the portion of RAM memory designated as read only. Once the allocating program has determined within which RAD it is operating, it may then preferentially assign or allocate memory to the requesting program within the RAD, if possible. Such an allocation may thus increase system performance over allocating non-local memory to the requesting program.

A second exemplary situation in which knowing a RAD specific attribute, such as a RAD identifier, may be useful is in the identification and execution of programs. In multiple processor systems, a replicated portion of the operating system executing on each processor may be responsible for identifying and loading programs to execute on its respective processor. This may be referred to as CPU scheduling. In much the same way that memory accesses may be to local or non-local memory, programs waiting to be executed may reside within local RAM, or non-local RAM. In accordance with embodiments of the invention, the portion of the operating system program executing on a processor may give preference to scheduling tasks or programs for execution that are local to its respective processor, with the determination based, at least in part, on reading the RAD identifier from the portion of the RAM designated as read-only.

Some RADs within multiple processor systems may not have local memory, and thus may depend on the RAM from other RADs as exemplified in FIG. 2 by RAD 30. In accordance with at least some embodiments, a VMA B and VMA C in a RAD without RAM, though having the same virtual address as other VMA Bs and VMA Cs, may point to common code and read-only areas within other RADs, as illustrated in FIG. 2. VMA A 96 may point to any read/write pages 56, 72 and 88 in the system 200, but consistent with the discussion above FIG. 2 shows VMA A 96 pointing to RAM 14.

Figure 4:
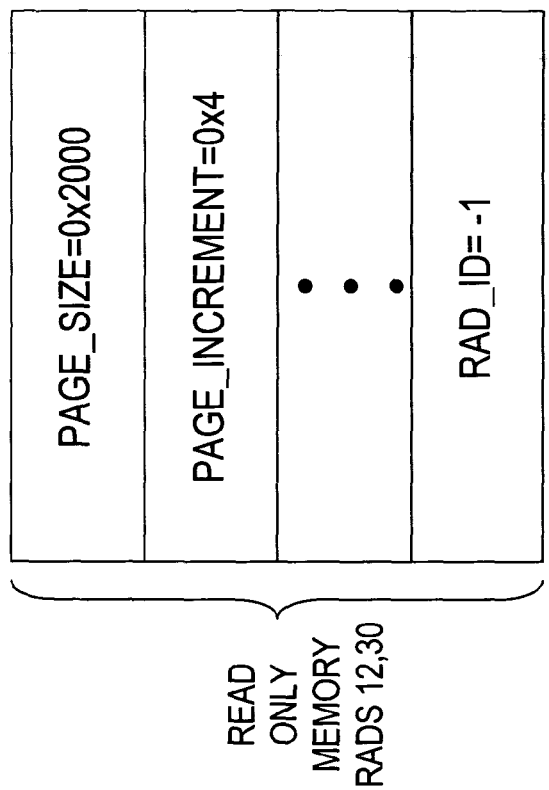
FIG. 4 illustrates a layout of read only memory associated with dependent RADs in accordance with embodiments of the invention.

RADs involved in dependence may not be able to place RAD specific attributes in the portion of RAM designated as read-only because multiple RADs may access the attributes. In accordance with at least some embodiments of the invention, RAD specific attributes may be assigned values that indicate dependence. For example, a RAD identifier in a RAD having RAM and involved in dependence may take a value of negative one (−1). Other values may be equivalently used. Much like the RAD identifiers in exemplary RADs 18 and 24, the RAD identifier indicating dependence may be placed at any suitable time, such as during system initialization or after a trigger event. FIG. 4 may illustrate exemplary read-only memory contents for RAD 12 (which is involved in dependence) in system 200.

Thus, a program executing in RAD 30 may attempt to determine its RAD identifier by accessing VMA C 100, which in the exemplary embodiments may point to read-only area of RAM 14. Upon receiving the value of negative one, indicating dependence, the program may resort to determining the RAD identifier in other, more time-consuming ways. The other, more time consuming ways may comprise reading a processor identification number from a register in the processor, and then looking up the RAD identifier by comparing the processor identification number with a table stored in memory that relates processor identification number to RAD identifier.

In alternative embodiments of the invention, RADs involved in dependence may still access and utilize RAD specific attributes. In these alternative embodiments, a page table for a RAD without associated RAM may provide address translation to RAM within a different RAD, but need not necessarily point to the same RAD specific attributes. Referring again to FIG. 2, page table 94 in RAD 30, in particular VMA C 100, may alternatively provide address translation to a portion of memory designated as read-only in a different RAD, but the portion targeted may contain RAD specific attributes for the dependent RAD without associated RAM. Dashed line 102 pointing to exemplary read-only portion 104 illustrates these alternative embodiments. Thus, the exemplary RAD 18 may read and utilize RAD specific attributes, such as the RAD identifier in read-only portion 76. Likewise in these alternative embodiments, RAD 30 may refer to RAD specific attributes in RAM 20, such as reading a RAD_ID=0×30 from the read-only portion 104. Because RAD 30 may not depend from RAD 12 in this specific example, the RAD_ID in portion 14 may reflect the RAD identifier for RAD 12. While the alternative embodiments may provide the RAD specific attributes for the RADs involved in dependence, RAD 30 may still incur a performance penalty for accessing the non-local RAM 20. The performance penalty may be less, however, than determining the RAD specific attributes through other mechanisms.

Numerous variations and modifications will become apparent to those skilled in the art once the above disclosure is fully appreciated. It is intended that the following claims be interpreted to embrace all such variations and modifications.

What is claimed is:

1. A method comprising:
   determining, by a first program, an attribute of a first functional unit by referencing a virtual memory address, the first functional unit comprising a first processor, a first page table, and a random access memory (RAM)

coupled to the first processor in a computer system, and the first program executing in the first functional unit;

determining, by a second program, an attribute of a second functional unit by referencing the virtual memory address, the second functional unit comprising a second processor, a second page table, and a RAM coupled to the second processor in the computer system, and the second program executing in the second functional unit;

wherein the referencing the virtual memory address by the first program provides a pointer to an attribute stored in the RAM of the first functional unit, and wherein the referencing the virtual memory address by the second program provides a pointer to an attribute stored in the RAM of the second functional unit and the pointer and the attribute of the second functional unit are different than the pointer and attribute of the first functional unit; and wherein the first and second page tables each translate the virtual memory address to different physical addresses;

saving a replicated portion of an operating system program and the attribute of the first functional unit to a read-only portion of the RAM of the first functional unit; and saving a replicated portion of an operating system program and the attribute of the second functional unit to a read-only portion of the RAM of the second functional unit, wherein the first and second page tables each translate a second virtual memory address to a same physical address.

2. The method as defined in claim 1 wherein determining an attribute of a first functional unit further comprises determining low and high physical address of the RAM of the first functional unit.

3. The method as defined in claim 1 wherein determining an attribute of a first functional unit further comprises determining a list of input/output devices local to the first functional unit.

4. A computer system comprising:
a first processor coupled to a first random access memory (RAM), the first processor and first RAM forming a first resource affinity domain (RAD);
a second processor coupled to a second RAM, the second processor and second RAM forming a second RAD, and wherein the second processor is coupled to the first processor;
a RAD specific attribute of the first RAD along with a replicated portion of an operating system stored in the first RAM, wherein the replicated portion of the operating system, when executing in the first RAD, reads the RAD specific attribute of the first RAD by reference to a virtual memory address; and
a RAD specific attribute of the second RAD along with a replicated portion of the operating system stored in the second RAM, wherein the replicated portion of the operating system, when executing in the second RAD, reads the RAD specific attribute of the second RAD by reference to the virtual memory address, wherein a first page table in the first RAD and a second page table in the second RAD each contain an entry corresponding to the virtual memory address, and the RAD specific attribute is a RAD identifier.

5. The computer system as defined in claim 4 further comprising:
wherein the RAD specific attribute of the first RAD is a RAD identifier; and
wherein the operating system program stored in the first RAM, when executed by the first processor, determines the RAD within which the operating system program is executed by reading the RAD identifier from the first RAM.

6. The computer system as defined in claim 4 wherein each replicated operating system program, when executed by the processors in its RAD, uses the RAD identifier to determine a local RAM for memory allocation.

7. The computer system as defined in claim 4 wherein each replicated operating system program, when executed by the processor in its RAD, uses the RAD identifier for scheduling a program stored in local RAM.

8. Computer readable media comprising an executable program that, when executed, implements a method comprising:
reading a functional unit identifier from a random access memory (RAM) coupled to a processor in which the program executes;
determining within which functional unit, identified by the functional unit identifier, the program is executing;
addressing data at a same virtual address by different processors in different functional units, wherein each processor in a different functional unit reads different data specific to its functional unit for the same virtual address; and
addressing data at a second same virtual address by the different processors in the different functional units, wherein the second same virtual address in each of the different functional units points to a same physical address, wherein the executable program further comprises scheduling a program to execute on the processor in the functional unit.

9. The computer readable media as defined in claim 8 wherein the executable program further comprises allocating memory from RAM within the functional unit, identified by the functional unit identifier, to a program executing on the processor in the functional unit.

* * * * *